United States Patent [19]

Featherston et al.

[11] 3,966,874

[45] June 29, 1976

[54] EXTRACTION OF ALUMINA FROM BAUXITE ORES

[75] Inventors: Richard H. Featherston, Richmond, Va.; Joseph P. Fischer, Ingleside, Tex.; Meriwether L. Garing, Portland, Tex.; James R. Wright, Corpus Christi, Tex.

[73] Assignee: Reynolds Metals Company, Richmond, Va.

[22] Filed: May 14, 1975

[21] Appl. No.: 577,411

[52] U.S. Cl................................. 423/121; 423/131; 423/122
[51] Int. Cl.² ............................................ C01F 7/06
[58] Field of Search....................... 423/121, 131, 119

[56] References Cited
UNITED STATES PATENTS

| | | | |
|---|---|---|---|
| 1,422,004 | 7/1922 | Sherwin | 423/121 |
| 2,701,751 | 2/1955 | Porter | 423/121 |
| 2,701,752 | 2/1955 | Porter | 423/121 |
| 2,926,069 | 2/1960 | Perrin et al. | 423/121 |
| 3,714,792 | 2/1973 | Murphy et al. | 423/119 |
| 3,737,514 | 6/1973 | King | 423/121 |

FOREIGN PATENTS OR APPLICATIONS

| | | | |
|---|---|---|---|
| 400,984 | 11/1933 | United Kingdom | 423/121 |
| 404,028 | 1/1934 | United Kingdom | 423/121 |
| 427,459 | 4/1935 | United Kingdom | 423/121 |

*Primary Examiner*—Herbert T. Carter
*Attorney, Agent, or Firm*—Glenn, Palmer, Lyne, Gibbs & Clark

[57] ABSTRACT

An improved wet caustic process of the Bayer method for the extraction of alumina from bauxite containing amounts of both goethite and a monohydrated alumina wherein lime is added only after the bauxite slurry has been heated to a digestion temperature of at least 200°C.

8 Claims, No Drawings

EXTRACTION OF ALUMINA FROM BAUXITE ORES

BACKGROUND OF THE INVENTION

The present invention relates to process for the treatment of bauxite ores so as to recover alumina therefrom. The Bayer method for the recovery of alumina from bauxite ores is well known and practiced widely. Generally speaking the Bayer process involves forming a slurry of the ore in a caustic solution and digesting the caustic slurry at an elevated temperature for a period of time so as to extract the caustic soluble alumina values into solution and form an alumina or sodium aluminate enriched caustic liquor in which there is suspended various insolubles such as silicon and iron compounds. The effluent from the digestion is then treated to separate the liquor from the insolubles and the liquor treated so as to recover the alumina values contained therein.

The composition of a bauxite ore will vary widely depending on its source, with the major components generally existing as a mixture of specific mineral forms each of which has differing physical and chemical characteristics. The component of most importance is of course alumina and this is usually present as a trihydrated alumina ($Al_2O_3 \cdot 3H_2O$) known as gibbsite and/or a monohydrated alumina ($Al_2O_3 \cdot H_2O$), that is either boehmite or diaspore. The trihydrated alumina is most desirable since it is caustic soluble at relatively low digestion temperatures and presents no serious process problems, the monohydrated alumina being more difficult to dissolve and requiring higher digestion temperatures. In the lower grade ores which are common today, ninety percent (90%) or more of the alumina may be present in the form of a monohydrated alumina.

The iron in a bauxite ore will generally be present as hematite ($Fe_2O_3$) and goethite [$(FeO)OH$] and sometimes a small percentage of magnetite ($Fe_3O_4$) will be present. Hematite is a dense material which causes no serious processing problems. Iron present in the goethite phase has a lower density due to the hydrate water but is readily dehydrated at around 150°C. However, when goethite is dehydrated it is believed to leave a skeletal particle having even lower particle density due to its porous character. The dehydrated particle is amorphous in character and settles with extreme difficulty in the recovery section of the Bayer process. Many bauxite ores being commercially processed at the present time may contain 90% or more of the iron present in the goethite phase.

Also present in bauxite ores will be varying amounts of undesirable elements such as silicon, zinc, phosphorus and titanium. Silica is undesirable as it will dissolve at elevated temperatures to form a sodium silicate which in turn reacts with the dissolved alumina to form an insoluble silicate complex with the approximate molar composition of $3Na_2O \cdot 3Al_2O_3 \cdot 5SiO_2 \cdot Na_2CO_3$. It can be seen that up to four moles of soda and three moles of alumina can be lost to this reaction; however, the reaction must be allowed to proceed in order to prevent contamination of the product and formation of scale on vessel walls. The zinc, phosphorus and titanium which may be present, if uncontrolled can cause product contamination as well as other problems. For example, phosphorus compounds can cause serious filtration problems.

It has been known in the prior art to add lime, or other equivalent calcium compound, to solve various problems. Several advantages can be obtained by the addition of lime. For example, lime addition will cut down on soda losses through the above-mentioned insoluble silicate complex since the lime will substitute into the complex so as to liberate some soda. Lime addition also causes formation of insoluble calcium phosphate such that phosphorus contaminates may be removed. Others have reported increased alumina recovery from a bauxite containing goethite and titanium by a process involving lime addition. Thus the use of lime in the Bayer process is well known and generally recognized to be beneficial.

One of the lower grade bauxite ores which is being mined today is one containing substantial amounts of both goethite and a monohydrated alumina. The processes known in the prior art utilizing addition of lime may be used to produce a satisfactory product from such an ore; however, since the economic practicality of a given process often depends on a relative narrow margin of production, any change which will result in an increase in production and/or decrease in process costs and problems is greatly desired. It is for this reason that research is constantly underway for improving the processing of these lower grade ores.

It is thus an object of the present invention to provide a new and useful wet caustic process of the Bayer type for recovering alumina from a bauxite containing amounts of both goethite and a monohydrated alumina. A more particular object of the present invention is to provide a new and improved wet caustic process of the Bayer type and involving the addition of lime, or its equivalent, for the processing of a bauxite containing goethite and a monohydrated alumina. Additional objects will become apparent from the following description of the present invention.

SUMMARY

The foregoing and additional objects are accomplished by the present invention which in one of its aspects is an improved wet caustic process for the extraction of caustic soluble alumina values from a bauxite containing, on a dry basis, at least 1% by weight of goethite, calculated as $(FeO)OH$, and at least 1% by weight of a monohydrated alumina, calculated as $Al_2O_3 \cdot H_2O$, which process comprises sequentially: (a) forming a caustic slurry of said bauxite; (b) in a preheating zone preheating said caustic slurry of bauxite in the absence of hereafter defined calcium compound and in the liquid phase to a temperature of at least 200°C; (c) passing the preheated slurry to a digestion zone wherein said slurry is maintained in the liquid phase under digesting conditions of at least 225°C for a digesting time sufficient to dissolve substantially all of the caustic soluble alumina from said bauxite, there being also added to said digestion zone a calcium compound selected from the group consisting of CaO, Ca(OH)$_2$ and CaCo$_3$; and (d) removing the resulting slurry from said digestion zone and in a recovery zone recovering the alumina values therefrom.

DETAILED DESCRIPTION OF THE INVENTION

In the following description and in the claims, all parts and percentages are by weight unless otherwise specified. Any references to the use of lime are intended to cover lime and the calcium compounds equivalent thereto, that is CaO, Ca(OH)$_2$ and CaCO$_3$.

Also, when referring to weights or percentages in reference to a bauxite ore, such is on dry basis, that is dry at a constant temperature of 110°C.

The present invention is applicable to the processing of a bauxite ore containing amounts of iron in the goethite phase and alumina as a monohydrated alumina, that is diaspore or boehmite, especially the latter. This combination of goethite and a monohydrated alumina is found in ore deposits in various parts of the world including Jamaica, South America, Greece, Hungary, Haiti and Australia. The monohydrated alumina in these ores is particulary hard to solubilize, it being believed that some of the alumina is substituted into the goethite lattice. The process of the invention may be used to advantage in processing ores containing any appreciable amounts of the goethite and the monohydrated alumina although generally will be applied to those bauxites containing at least 1% of goethite, calculated as (FeO)OH, and at least 1% monohydrated alumina, calculated as $Al_2O_3 \cdot H_2O$. A typical bauxite ore which would be processed according to the present invention would contain, for example, from 1 to 25%, especially 1 to 20%, by weight of goethite and 1 to 60%, especially about 1 to 30%, by weight of monohydrated alumina. Further, the bauxite ores to which the present invention is applicable may contain only a minor portion of the total iron present in the goethite phase or may contain 90% or more of the total iron present in the goethite phase. This is also true for the monohydrated alumina, that is the monohydrated form may comprise only a minor portion of the total alumina present or practically all of the alumina may be in the monohydrated form.

The various impurities mentioned above, such as compounds of titanium, zinc, phosphorus and silicon may be present in varying amounts in any particular ore to be treated. In fact, one of the beneficial results to be obtained by the addition of lime according to the invention is the removal of such type impurities, excepting a zinc impurity. A zinc compound may be made even more soluble by the addition of lime than it would otherwise be; however, any zinc impurity may be removed by addition of a sulfide to form an insoluble zinc sulfide which is removed by filtration. The fact that a zinc impurity may be made soluble actually enhances the reaction efficiency of a sulfide so that more zinc may be removed by sulfide treatment.

In a process conducted according to the invention, a caustic slurry of bauxite will first be formed by conventional methods. This slurry should contain by weight from about 8 to 15%, preferably 10 to 11%, of the bauxite ore (on a dry basis) and 210 to 280, preferably 220 to 230, grams per liter of caustic soda, caustic soda concentration being calculated as $Na_2CO_3$ throughout the claims and specification. The term "caustic soda" includes the caustic soda combined with alumina as sodium aluminate and the free form. Generally, the weight ratio of $Al_2O_3$ to $Na2CO_3$ in the caustic slurry to be treated should be within the range of 0.6:1 to 0.75:1. In the usual process the caustic solution utilized in forming the slurry to be treated is a recycled spent liquor together with makeup sodium hydroxide. The recycled spent liquor in many instances is concentrated by evaporation prior to mixing it with bauxite ore.

After obtaining the caustic slurry of bauxite it is preheated in a preheating zone and then passed to a digestion zone where it is maintained at elevated temperatures for a time sufficient to dissolve substantially all of the caustic soluble alumina from the bauxite ore. The temperature of the digestion zone will vary according to the particular ore being treated but will be at least 225°C and in general will be within the range of 225°C to 275°C, preferably from 230°C to 250°C. The temperature of the digestion zone may vary from one portion thereof to another and does not need to be uniform throughout. Thus, where there are two or more digester vessels, each may be at a different temperature. The digestion zone will also be maintained at a superatmospheric pressure which merely needs to be sufficient to maintain a liquid phase, that is, sufficient to prevent boiling. Usual pressure ranges will be from 26 to 40 atmospheres absolute.

The slurry to be treated must be preheated to at least 200°C prior to passing it to the digestion zone although where the digestion zone is maintained at temperatures above 225°C, then the slurry is preferably preheated to or substantially to, that is within 30°C of, the temperature of the portion of the digestion zone to which the preheated slurry is passed. The preheating to at least 200°C must be accomplished in the absence of lime, it being critical to the present invention that the lime not be present for any appreciable time prior to passing the slurry to the digestion zone. The preheating may be accomplished in conventional equipment, such as a series of tubular heaters.

The digestion zone may also be of conventional design and may comprise a single vessel or a plurality of vessels in series. After the slurry has been preheated to a temperature of at least 200°C, then it along with the lime are passed to the digestion zone. Thus, the lime must be added to the digestion zone itself, or, to the preheated bauxite slurry immediately prior to its being passed to the digestion zone, it being preferable to add the lime to the digestion zone itself. The lime should be added so as to be present throughout the digestion stage. The amount of lime or other equivalent calcium compound added will vary according to the particular ore being processed since, as pointed out above, the lime will combine with or substitute into various components of bauxite ores. More specifically, as pointed out above, these components with which the lime will combine will generally be from among the group consisting of $P_2O_5$, $TiO_2$ and the said insoluble silica complex. The amount of such components will vary from ore to ore and thus the amount of lime which will convert or substitute into the undesirable components will vary, and cannot be calculated with certainty from an analysis of an ore since all of the components which would theoretically react with the lime will not in actual practice so react. In practicing the present invention, it is important that the amount of lime added be no more than that which, under digestion zone conditions, will actually combine with or substitute into any compounds or complexes of silicon, titanium, phosphorus or other undesirable compounds present. That is an excess is not desired and is deleterious. Whether or not an excess of lime has been added can easily be determined by analyzing the effluent of the digestion zone for the presence of calcium aluminate, the presence of such compound being undesirable and indicative of the fact that too much lime has been added. If desired the effluent may be constantly monitored for calcium aluminate and the lime addition based thereon; however, for a given ore shipment or source constant monitoring is usually not necessary. Generally speaking the amount of lime added (calculated as CaO) should be by weight at least 1%, preferbly at least 1.5%, of the weight of the dry bauxite used in forming the slurry, but insufficient to cause the presence of calcium aluminate in the effluent of the digestion zone. For most ores the amount of lime to be used will be from about 1.5 to 3.0% by weight of the dry bauxite used to form the slurry. The presence of calcium aluminate in the digester effluent may be established by X-ray diffraction.

The heated slurry or suspension removed from the digesters will consist of a pregnant liquor (also known as green liquor) containing alumina values in solution and an insoluble portion known in the industry as red mud. The red mud consists of iron compounds and the like which do not dissolve during the digestion, including some undissolved alumina, as well as insolubles which were formed during the digestion such as an insoluble silicate complex and compounds of calcium with phosphorus and titanium. Due to the addition of the lime during the digestion, the molar composition of the insoluble silicate complex in the red mud will be somewhat modified from that mentioned above due to the desired substitution of calcium for some of the soda and alumina values in the complex.

This heated slurry or suspension removed from the digestion zone is passed to a recovery zone where it is clarified in the conventional manner using settlers, decantation and filtration, and the pregnant liquor seeded with trihydrated alumina crystals so as to precipitate the alumina values contained therein. Advantageously, the heated slurry or suspension from the digestion zone is first treated so as to reduce the temperature thereof and pressure thereon by conventional means, such as by flash cooling in a series of flash tanks. The cooled slurry is then preferably treated with a flocculant such to aid in the coagulation of the red mud and fed to a settler where the coagulated red mud settles. If desired, the cooled slurry may be diluted prior to addition of the flocculant so as to aid in the settling operation. The clarified green liquor is then separated from the red mud and then alumina trihydrate seed introduced into the clarified liquor which is further cooled and agitated for several hours such that a portion of the sodium aluminate is decomposed causing alumina trihydrate to precipitate. The alumina trihydrate is separated from the liquor, washed and calcined to form anhydrous alumina, and the liquor (after concentration by evaporation) recycled to the beginning of the process for formation of the initial caustic bauxite-slurry. The red mud which is separated from the green liquor is advantageously passed through a series of countercurrent washing stages and then to waste, with the wash liquor recycled for dilution of the cooled, digested slurry.

The foregoing general description of a process of recovery of alumina from the heated slurry or suspension removed from the digestion zone is preferred for such, but should not be taken as limiting the scope of the invention. Various other recovery schemes are known in the art and any of these could be utilized.

By operating according to the invention instead of operating according to the prior art where lime is added prior to or after the digestion, an increased yield of alumina is obtained. The reason for this is not entirely understood but it is believed that addition of the lime to the slurry only after it is heated causes more of the alumina monohydrate, which is substituted within the goethite lattice, to be solubilized. Additional benefits such as reduced soda loss to the insoluble silicate complex and less flocculant usage are also obtained over processes where lime is added prior to or after the digestion. It has also been found that when processing a bauxite containing titanium dioxide, undue calcium titanate scale formation occurs in heaters and related equipment if lime is present during the preheating, whereas, such scale is not encountered in the process described herein.

The following example is given to illustrate the presently preferred practice of the invention but is not to be construed as limiting the scope of the appended claims.

EXAMPLE

A Jamaican bauxite is treated in a continuous process according to the present invention. Analysis shows the composition of the bauxite to be about 48.7% $Al_2O_3$, 19.1% $Fe_2O_3$, 1.7% $SiO_2$, 2.4% $TiO_2$, 0.8% $P_2O_5$, and 0.3% $CaO$, the remaining 27% being the loss on ignition upon keeping the bauxite at 1000°C for 60 minutes. Analysis also shows that 81.7% of the total iron oxide present is in the goethite phase and that 7.4% of the total alumina present is as boehmite, a monohydrated alumina. About 87,300 kilograms per hour of the dry bauxite ore and 737,400 kilograms per hour of caustic aluminate solution containing 225 grams per liter caustic soda (calculated as $Na_2CO_3$) are mixed together to form a slurry. This slurry is then heated in a series of tubular heaters to about 210°C and passed to the first of three digester vessels maintained at 240°C and 32 atmospheres absolute. About 1,745 kilograms per hour of lime are continuously added directly to the feed line just prior to its entry to the first digester vessel, there also being fed 50,000 kilograms per hour of steam (255°C and 42 atmospheres absolute) to the first digester vessel. After a residence time of about 45 minutes in the digesters, the effluent slurry from the third and last digester is passed through a series of flash tanks whereby the temperature thereof is reduced to 108°C and the pressure to atmospheric. About 172,000 kilograms per hour water is removed by the flash cooling. To the cooled slurry there is first added about 392,000 kilograms per hour recycle wash water from the mud washing stage and then 1,900 kilograms per day of starch, the resulting slurry then being fed to a settler. About 882,000 kilograms per hour clarified green liquor are removed from the red mud by filtration and 0.06 kilograms alumina trihydrate seed crystals added per kilogram of green liquor. The seeded green liquor is then further cooled to about 60°C and agitated for about 30 hours during which time a portion of the sodium aluminate is decomposed causing alumina trihydrate to precipitate. The trihydrate is washed and calcined to obtain high purity alumina, the yield of alumina being about 0.41 kilograms per kilogram of bauxite ore processsed, or about 87% of the $Al_2O_3$ in the ore.

When the process of the Example is repeated except that lime is added to the cooled slurry passed to the settler, starch usage is increased by as much as 3 times, soda losses are increased by 10% and alumina recovery drops to about 84% of that present in the ore. When the process of the Example is repeated except that the lime is added to the initial slurry prior to the preheating, calcium titanate scale formation in the preheaters causes frequent shutdowns for cleaning and the alumina recovery is about 86% of that present in the ore. Also slightly more soda loss and slightly more starch usage occurs than in the process of the Example.

What is claimed is:

1. An improved wet caustic process for the extraction of caustic soluble alumina values from a bauxite containing, on a dry basis, at least 1% by weight of goethite, calculated as (FeO)OH, and at least 1% by weight of a monohydrated alumina, calculated as $Al_2O_3 \cdot H_2O$, which process comprises the steps of: (a) forming a caustic slurry of said bauxite; (b) in a preheating zone preheating said caustic slurry of bauxite in the absence of a hereafter defined calcium compound and in the liquid phase to a temperature of at least 200°C; (c) passing the preheated slurry to a digestion zone wherein said slurry is maintained in the liquid phase under digesting conditions of at least 225°C for a digesting time sufficient to dissolve substantially all of the caustic soluble alumina from said bauxite, there being also added to said digestion zone a calcium compound selected from the group consisting of CaO, Ca(OH)$_2$ and CaCo$_3$; and (d) removing the resulting slurry from said digestion zone and in a recovery zone recovering the alumina values therefrom.

2. The process of claim 1 wherein said caustic slurry contains from about 8 to 15% by weight of said bauxite, on a dry basis, and contains from about 210 to 280 grams per liter of caustic, calculated as $Na_2CO_3$.

3. The process of claim 1 wherein said bauxite, on a dry basis, contains from about 1 to 25% by weight of geothite and from about 1 to 60% by weight of monohydrated alumina.

4. The process of claim 3 wherein said monohydrated alumina is boehmite.

5. The process of claim 2 wherein the amount of said calcium compound added is, calculated as CaO, at least 1% by weight of the said bauxite, on a dry basis, utilized to form said slurry but insufficient to result in the presence of calcium aluminate in the effluent of said digestion zone.

6. The process of claim 5 wherein said digestion zone is maintained at a temperature within the range of about 230 to 250°C.

7. The process of claim 6 wherein said bauxite ore contains by weight from about 1 to 20% goethite and about 1 to 30% boehmite, and wherein said caustic slurry contains by weight from about 10 to 11% of bauxite, on a dry basis, and from about 220 to 230 grams per liter of caustic soda.

8. The process of claim 7 wherein the amount of calcium compound added, calculated at CaO, does not exceed about 3% by weight of the said bauxite, on a dry basis.

* * * * *